(12) United States Patent
Cheng et al.

(10) Patent No.: US 8,711,322 B2
(45) Date of Patent: Apr. 29, 2014

(54) ELECTROWETTING DISPLAY DEVICES WITH A REFLECTIVE PLATE STRUCTURE

(75) Inventors: Wei-Yuan Cheng, Taipei County (TW); Chih-Chun Hsiao, Kaohsiung (TW); Jen-Chieh Yang, Changhua County (TW); Kuo-Lung Lo, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1121 days.

(21) Appl. No.: 12/193,645

(22) Filed: Aug. 18, 2008

(65) Prior Publication Data

US 2009/0103159 A1 Apr. 23, 2009

(30) Foreign Application Priority Data

Oct. 18, 2007 (TW) .............................. 96138988 A

(51) Int. Cl.
*G02F 1/1335* (2006.01)
*C09K 19/52* (2006.01)
*G02B 26/00* (2006.01)

(52) U.S. Cl.
CPC ............ *G02B 26/004* (2013.01); *G02B 26/005* (2013.01)
USPC ............ 349/163; 345/690; 349/114; 359/292

(58) Field of Classification Search
CPC .......................... G02B 26/004; G02B 26/005
USPC ................... 349/114, 163, 115; 359/291, 290
See application file for complete search history.

(56) References Cited

U.S. PATENT DOCUMENTS

| 6,967,763 | B2 | 11/2005 | Fujii et al. | |
|---|---|---|---|---|
| 2007/0115411 | A1* | 5/2007 | Ozawa et al. | 349/114 |
| 2008/0297880 | A1* | 12/2008 | Steckl et al. | 359/291 |
| 2009/0316253 | A1* | 12/2009 | Fairley et al. | 359/292 |
| 2010/0223779 | A1* | 9/2010 | Lo et al. | 29/592.1 |
| 2011/0058245 | A1* | 3/2011 | Wang et al. | 359/290 |
| 2011/0181952 | A1* | 7/2011 | Kim et al. | 359/485.01 |

FOREIGN PATENT DOCUMENTS

| TW | I269889 | 1/2007 |
|---|---|---|
| TW | I287646 | 10/2007 |
| WO | WO 2006/017129 A1 | 2/2006 |
| WO | WO 2006017129 A2 | 2/2006 |

OTHER PUBLICATIONS

Taiwan Patent Office, Notice of Allowance Application Serial No. 096138988, Jun. 7, 2011, Taiwan.

* cited by examiner

*Primary Examiner* — Huyen Ngo

(57) ABSTRACT

Electrowetting display devices are presented. The electrowetting display includes a first substrate and an opposing second substrate with a transparent polar fluid layer and an opaque non-polar fluid layer insoluble with each other and interposed between the first and second substrates. A first transparent electrode is disposed on the first substrate. A second transparent electrode is disposed on the second substrate. A dielectric layer is disposed on the second transparent electrode. A reflective plate structure is interposed between the second transparent electrode and the second substrate, thereby defining a reflective region and a transmission region. A backlight plate is disposed on the back of the second substrate. During operation, the opaque non-polar fluid converges, therefore, exposing equal areas of reflective region and transmission region.

30 Claims, 17 Drawing Sheets

ELECTROWETTING DISPLAY DEVICES WITH A REFLECTIVE PLATE STRUCTURE

CROSS REFERENCE TO RELATED APPLICATIONS

This application is based upon and claims the benefit of priority from a prior Taiwanese Patent Application No. 096138988, filed on Oct. 18, 2007, the entire contents of which are incorporated herein by reference.

BACKGROUND OF THE INVENTION

1. Field of the Invention

The invention relates to display devices, and in particular to transflective electrowetting display devices.

2. Description of the Related Art

Electrowetting display devices are rendered images in accordance with electrowetting or electrocapillary. Briefly, the free surface energy of some fluids is changed due to electric field effects such that distribution area of the fluids can thus change along with the electric field effects.

U.S. Pat. No. 6,967,763, the entirety of which is hereby incorporated by reference, discloses an electrowetting display device. An opaque non-polar fluid in the electrowetting display device converges due to electrowetting effect, thereby controlling a bright state and/or a dark state of a pixel. FIGS. 1A and 1B are cross sections respectively illustrating a voltage on-state and a voltage off-state for a conventional electrowetting display. Referring to FIG. 1A, a conventional electrowetting display 10 includes a substrate 16 with a patterned pixel electrode 15 disposed thereon. A dielectric layer 14 having a hydrophobic surface is disposed on the patterned pixel electrode 15. Patterned hydrophilic bank structures 13 are disposed on the dielectric layer 14, thereby defining a pixel region. An opaque non-polar fluid 12 containing a black dye and transparent polar fluid 11 are disposed in each pixel region. When the applied voltage is "off", the opaque non-polar fluid 12 uniformly distributes in a pixel region, thereby rendering the pixel region to display a dark state.

On the contrary, when the applied voltage is "on", the opaque non-polar fluid 12 is affected by electrowetting force and converged far away from the pixel electrodes 15. A large portion of the pixel region is thus exposed, thereby rendering the pixel region to display a bright state, as shown in FIG. 1B.

Conventional transflective color electrowetting displays use black oils as a light absorber and incorporatedly use color filters to achieve a full-color display. More specifically, incident light is passed through the electrowetting display and is reflected by a reflector or back light and directly passed through the electrowetting display to reach and pass through color filters to render full color images. The reflective regions and transmission regions of the conventional transflective color electrowetting display, however, are improperly arranged such that gray scale of the electrowetting display becomes difficult to control. Therefore, the stability and quality of electrowetting displays are affected by gray scale variations.

WO 2006/017129, the entirety of which is hereby incorporated by reference, discloses a transflective color electrowetting display structure in which a lower substrate and an upper substrate attached with color filters are assembled. A transparent polar fluid and a black non-polar fluid are interposed between the lower and upper substrate. The transflective color electrowetting display includes a plurality of pixels. Each pixel is divided into a transmission region and a reflective region on the lower substrate.

FIGS. 2A and 2B are cross sections respectively illustrating a voltage on-state and a voltage off-state of another conventional transflective electrowetting display. Referring to FIG. 2A, a conventional transflective electrowetting display 20 includes a first substrate 21 and a second substrate 29 opposing each other with a transparent polar fluid layer 23 and an opaque non-polar fluid layer 24 interposed therebetween. A first transparent electrode 22 is disposed on the first substrate 21. A second transparent electrode 27 is disposed on the second substrate 29. A dielectric layer 26 having a hydrophobic surface is disposed on the second transparent electrode 27. A reflector 28 is disposed under the second transparent electrode 27, thereby defining a reflective region and a transmission region. A backlight unit 35 is disposed on the back of the second substrate 29. A power supply 30 applies a bias between the first transparent electrode 22 and the second transparent electrode 27. Electrowetting force due to the bias causes convergence of the opaque non-polar fluid layer, thereby controlling reflective and transmissive regions of each pixel operation. When the applied voltage exceeds the saturated voltage, the opaque non-polar fluid layer 24 completely converges. Both the reflective and transmissive regions are entirely exposed, as shown in FIG. 2A.

When the applied voltage is greater than the threshold voltage but less than the saturated voltage, the opaque non-polar fluid layer 24 partially converges such that the exposed reflective area is greater than the exposed transmission area. Variations of the exposed reflective and transmissive regions can cause deviation of the gray scale of the electrowetting display, as shown in FIG. 2B The following description discloses each displaying stage of a conventional transflective electrowetting display. Referring to FIG. 3A, a conventional transflective electrowetting display 100a includes a substrate 137. A patterned transparent pixel electrode 135 is disposed on the substrate 137. A reflector 136 is interposed between the transparent pixel electrode 135 and the substrate 137, thereby defining a reflective region and a transmission region. A dielectric layer 134 having a hydrophobic surface is disposed on the transparent pixel electrode 135. Patterned hydrophilic bank structures 133 are disposed on the dielectric layer 134, defining a pixel region. An opaque non-polar fluid 132 containing a black dye and transparent polar fluid 131 are disposed in each pixel region. A backlight unit 138 is disposed on the back of the substrate 137. An opposing substrate 140 with a transparent electrode 142 (i.e., common electrode) thereon is disposed opposite the substrate 137. When applied voltage is off, the opaque non-polar fluid 132 is uniformly distributed on the pixel region, whereby a dark state is rendered.

As the applied voltage increases to slightly exceed the threshold voltage, the opaque non-polar fluid 132 converges to expose a portion of the reflective region. At this stage, only a portion of incident light $L_I$ is reflected. A main portion of the pixel region is reflective, as shown in FIG. 3B. When the applied voltage is greater than the threshold voltage but less than the saturated voltage, the opaque non-polar fluid 132 is further converged such that the exposed reflective area is greater than the exposed transmission area, as shown in FIG. 3C. When the applied voltage is greater than the saturated voltage, the opaque non-polar fluid 132 completely converges, thus exposing both of the entire reflective and transmission regions, as shown in FIG. 3D.

As the applied voltage increases, pixels of the conventional transflective electrowetting display exposes the reflective region prior to the transmission region, resulting in gray scale variations and gray scale control difficulties under outdoor and indoor ambient environments. Furthermore, the stability and quality of the electrowetting display are affected by gray scale variations.

BRIEF SUMMARY OF THE INVENTION

A detailed description is given in the following embodiments with reference to the accompanying drawings.

Embodiments of the invention provide an electrowetting display device, comprising: a first substrate and an opposing second substrate with a transparent polar fluid layer and an opaque non-polar fluid layer interposed therebetween; a first transparent electrode disposed on the first substrate; a second transparent electrode disposed on the second substrate; a dielectric layer disposed on the second transparent electrode; a reflective plate structure interposed between the second transparent electrode and the second substrate, thereby defining a reflective region and a transmission region; and a backlight plate disposed on the back of the second substrate, wherein during operation, the opaque non-polar fluid converge, thereby exposing equal areas of the reflective region and the transmission region.

Embodiments of the invention also provide an electrowetting display device, comprising: a first substrate and an opposing second substrate with a transparent polar fluid layer and an opaque non-polar fluid layer interposed therebetween; a first transparent electrode disposed on the first substrate; a second transparent electrode disposed on the second substrate; a dielectric layer disposed on the second transparent electrode; a reflective plate structure interposed between the second transparent electrode and the second substrate, thereby defining the same areas of reflective regions and transmission regions in a pixel region; and a backlight plate disposed on the back of the second substrate, wherein during operation, the opaque non-polar fluid converges, thereby exposing equal areas of the reflective region and the transmission region.

Embodiments of the invention further provide an electrowetting display device, comprising: a first substrate and an opposing second substrate with a transparent polar fluid layer and an opaque non-polar fluid layer interposed therebetween; a first transparent electrode disposed on the first substrate; a patterned second transparent electrode disposed on the second substrate, wherein the patterned second transparent electrode is disposed on both ends of a pixel region; a dielectric layer disposed on the second transparent electrode; a reflective plate structure interposed between the second transparent electrode and the second substrate, thereby defining the same areas of reflective regions and transmission regions in a pixel region; and a backlight plate disposed on the back of the second substrate, wherein during operation, the opaque non-polar fluid converges, thereby exposing equal areas of the reflective region and the transmission region.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
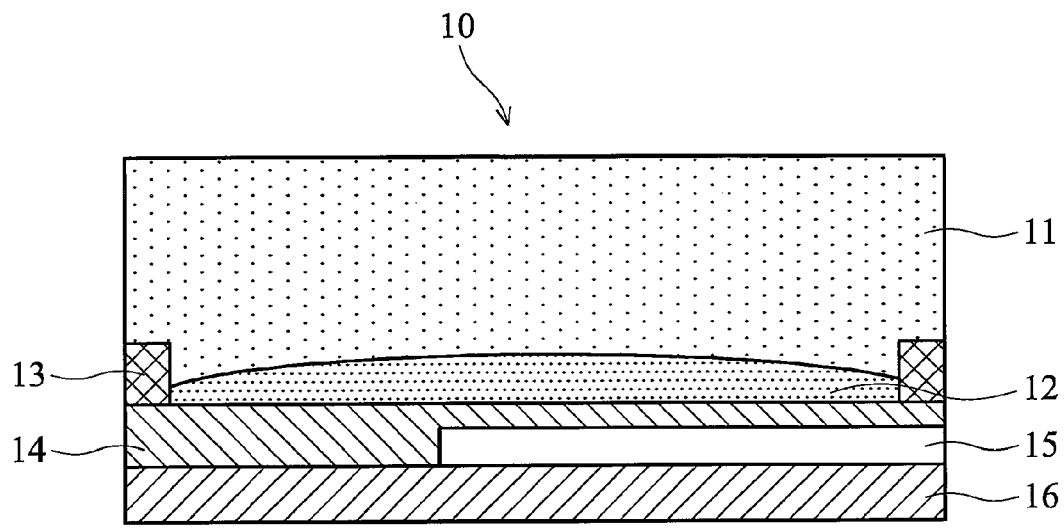
FIGS. 1A and 1B are cross section respectively illustrating a voltage on-state and a voltage off-state for a conventional electrowetting display.
Figure 1B:
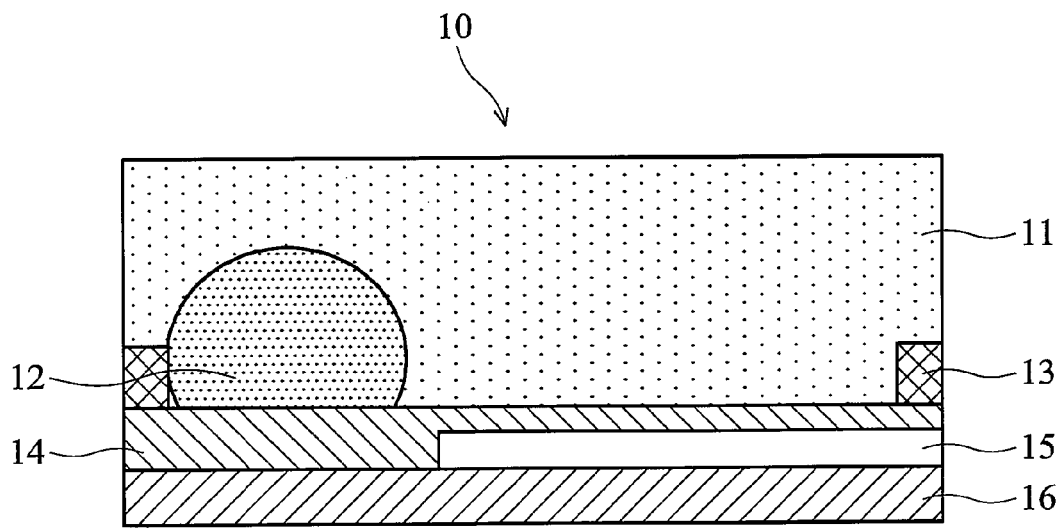
Figure 2A:
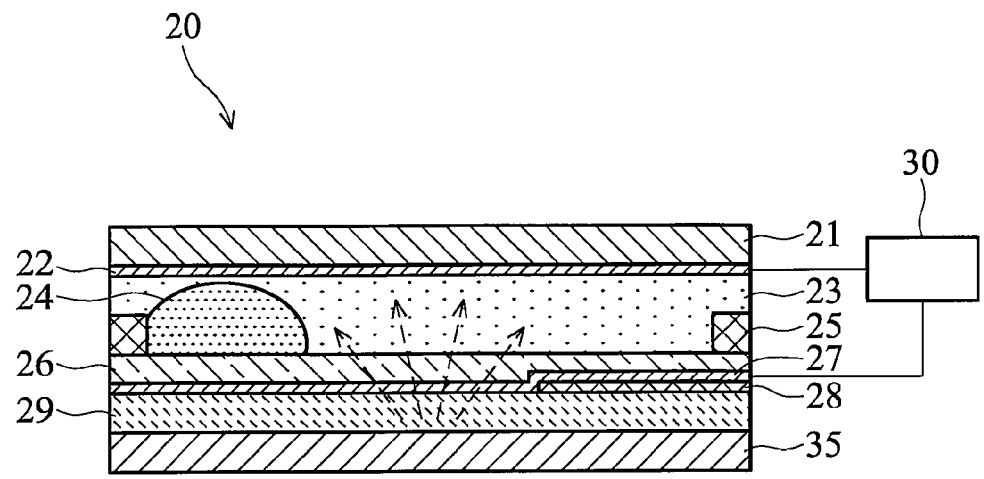
FIGS. 2A and 2B are cross sections respectively illustrating a voltage on-state and a voltage off-state of another conventional transflective electrowetting display.
Figure 2B:
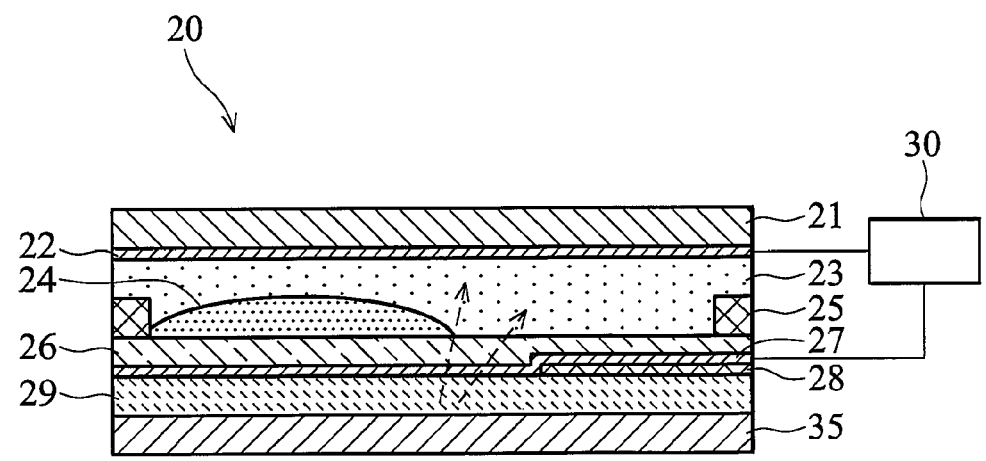
Figure 3A:
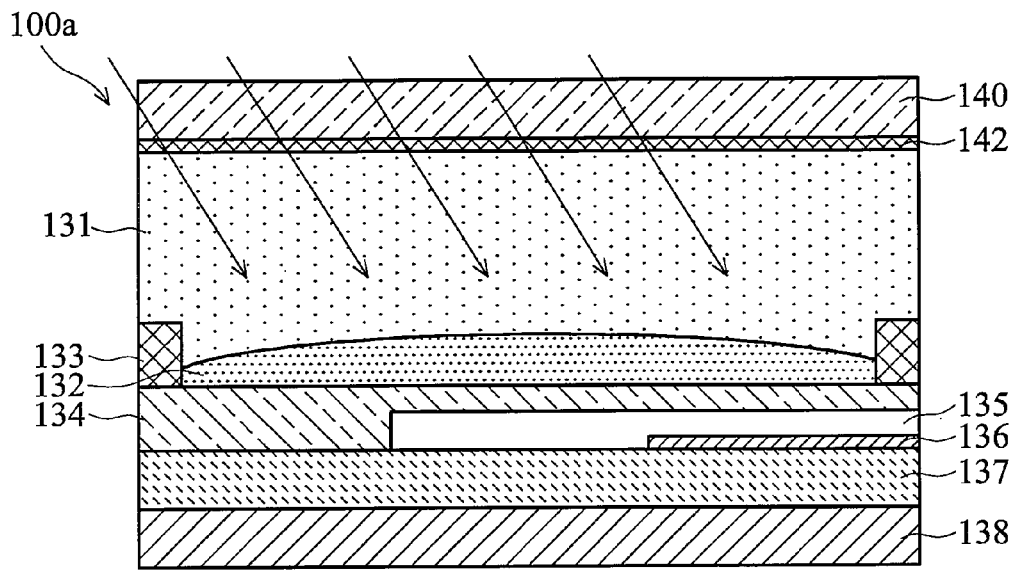
FIGS. 3A-3D are cross sections respectively illustrating each displaying stage of a conventional transflective electrowetting display.
Figure 3B:
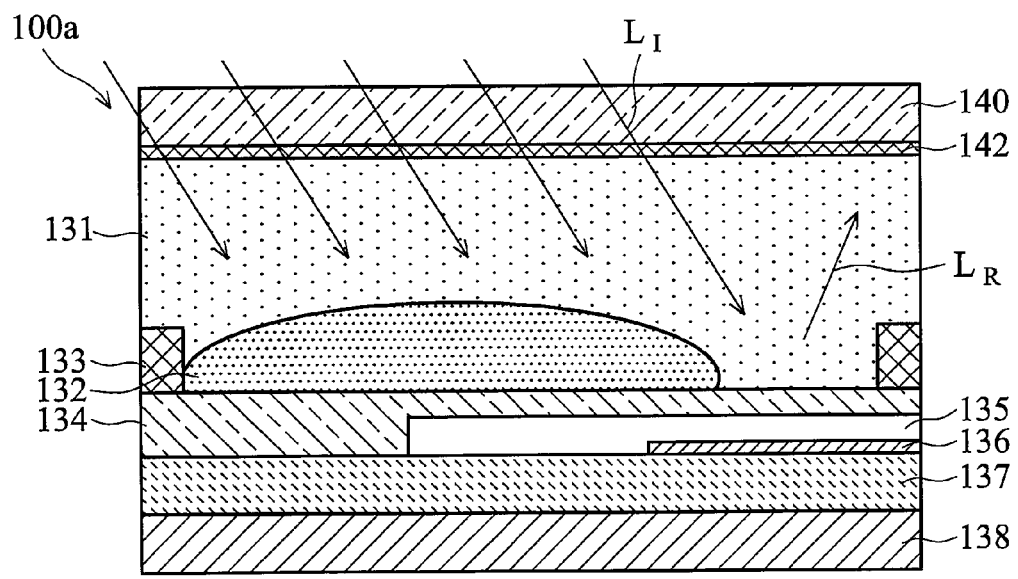
Figure 3C:
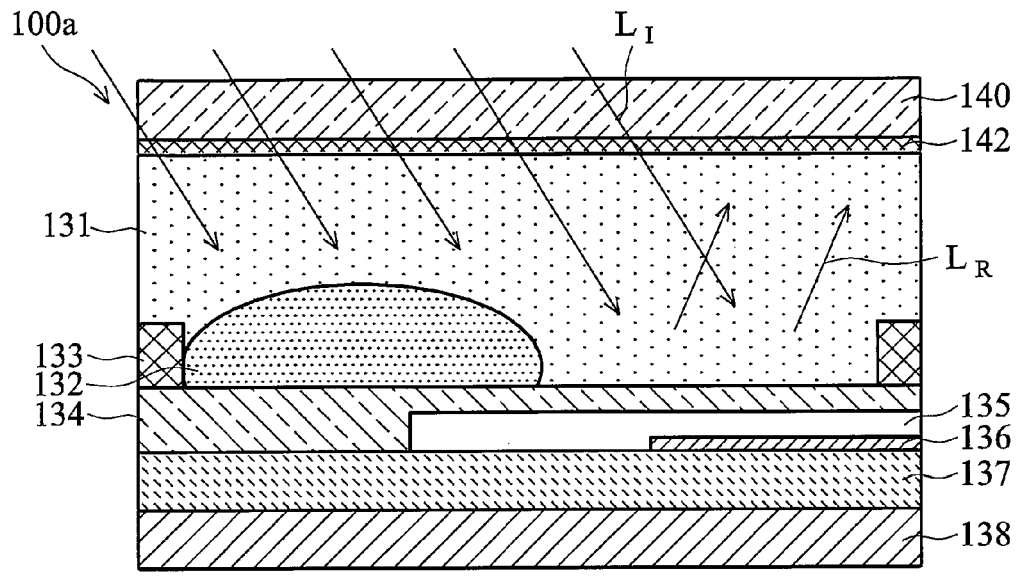
Figure 3D:
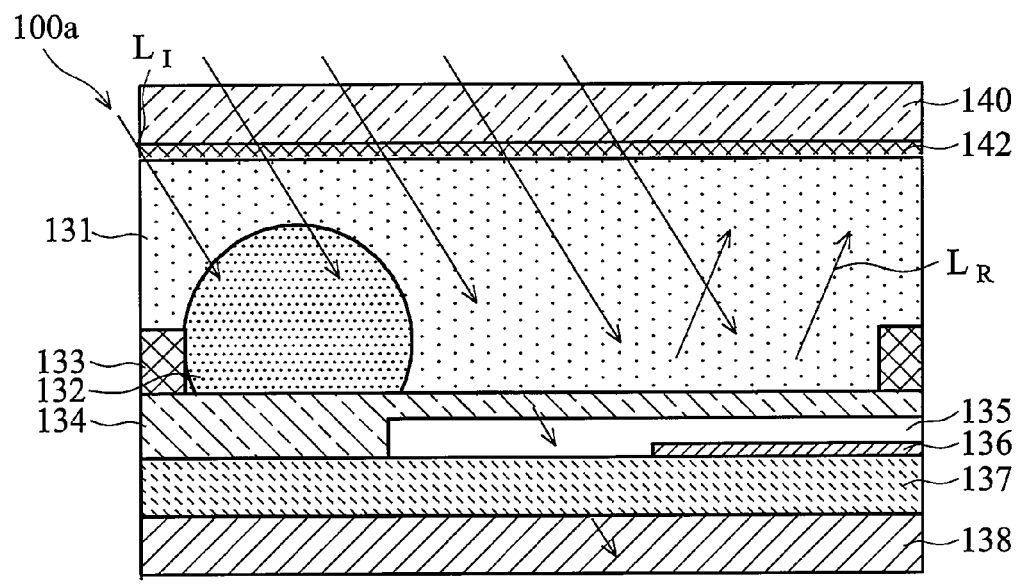

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

The invention are related to transflective electrowetting display devices. Patterned reflector structures are introduced and disposed on transmission regions of the transflective electrowetting display devices such that better image quality and stable-controlled gray scale is achieved. Thus, the advantage of the invention is that the stability and quality of the electrowetting display are improved due to stable gray scale control.

The electrowetting display devices of the invention are implemented by using surface characteristic changes of the opaque non-polar fluid due to electric field changes as the display media. More specifically, patterned reflector structures are formed on the lower substrate corresponding to each pixel of the transflective electrowetting display devices such that pluralities of sets of periodically arranged reflective regions and transmission regions are formed in a pixel region. During operation, the opaque non-polar fluid converges due to the applied electric field such that equal areas of the reflective regions and transmission regions are exposed, resulting in better image quality and stable-controlled gray scale. Thus, the advantage of the invention is that the stability and quality of the electrowetting display are improved due to stable gray scale control.

Figure 4A:
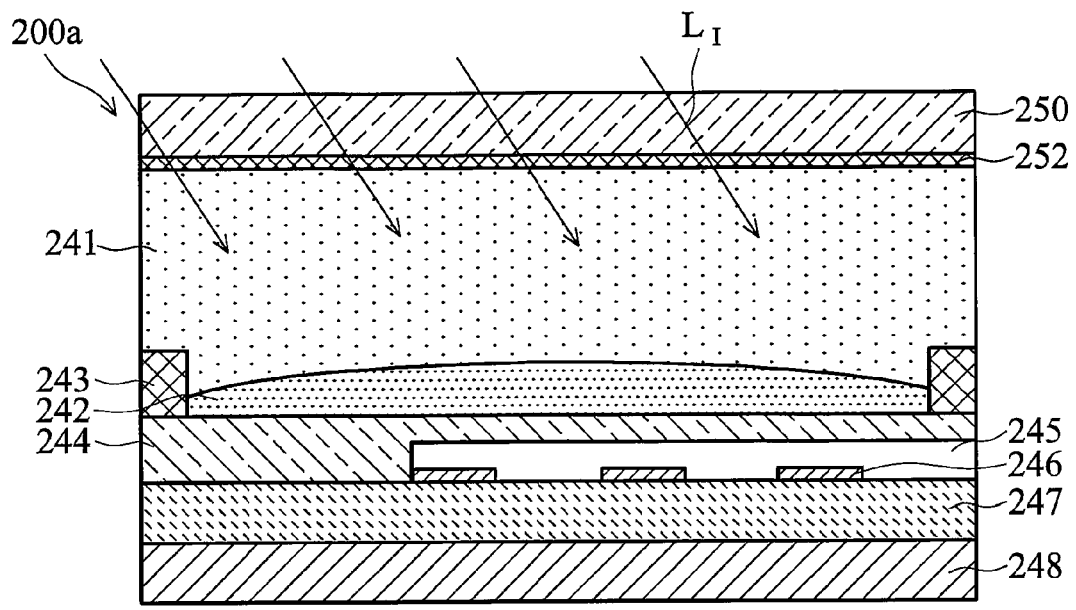
FIGS. 4A-4E are cross sections respectively illustrating each voltage applied stage of an embodiment of the transflective electrowetting display.

FIGS. 4A-4D are cross sections respectively illustrating each voltage applied stage of an embodiment of the transflective electrowetting display. Referring to FIG. 4A, a transflective electrowetting display 200a includes a first substrate 250 and an opposing second substrate 247 with a transparent polar fluid layer 241 and an opaque non-polar fluid layer 242 insoluble with each other and interposed between the first and second substrates. A transparent electrode 252 (i.e., common electrode) is disposed on the first substrate 250. The transparent electrode 252 can be made of indium tin oxide (ITO) or indium zinc oxide (IZO) with a thickness approximately in a range between 0.1 μm and 1 μm.

A patterned transparent pixel electrode 245 is disposed on the second substrate 247. For example, the transparent pixel electrode 245 can be a patterned structure comprising a rectangular, a square, a triangle, a circle, a trapezoid, or an ellipse. The transparent pixel electrode 245 can be made of indium tin oxide (ITO) or indium zinc oxide (IZO) with a thickness approximately in a range between 0.1 μm and 1 μm. Patterned periodic reflective plate structures 246 are interposed between the transparent pixel electrode 245 and the second substrate 247, thereby defining reflective regions and transmission regions. The reflective plate structures 246 can be a patterned structure including a plurality of sub-reflective plates. Each sub-reflective plate corresponds to a sub-reflective region. Alternatively, the reflective plate structures 246 can include a plurality of periodic sub-reflective plates, wherein each periodic sub-reflective plate corresponds to a sub-reflective region. Alternatively, the reflective plate structures 246 can be a patterned structure including at least one reflective plate. A boundary between the at least one reflective plate and the transmission region is created such that during operation, a direction of convergence of the opaque non-polar fluid layer is substantially parallel with the boundary. The reflective plate structures are made of Al, Ag, or MoW with a shape of a rectangular, a square, a circular, a triangular, a trapezoid, or an ellipse.

A dielectric layer 244 having a hydrophobic surface is disposed on the transparent pixel electrode 245. According an embodiment of the invention, the dielectric layer 244 having the hydrophobic surface is directly formed on the pixel electrode 245. The dielectric layer is made of parylene, silicon oxide ($SiO_x$), silicon nitride ($SiN_y$), polyvinyldiene fluoride, lead zirconate titanate (PZT), or barium strontium titanate (BST) with a thickness approximately in a range between 0.1 μm and 1 μm. In other embodiments of the invention, a hydrophobic layer 254 (FIG. 4E) can be disposed on the dielectric layer 244 to implement a hydrophobic surface. The hydrophobic layer 254 is made of fluoride containing hydrophobic polymers with a thickness approximately in a range between 0.1 μm and 1 μm.

Patterned hydrophilic bank structures 243 are disposed on the dielectric layer 244, defining pluralities of pixel regions. The patterned hydrophilic bank structures 243 are made of a hydrophilic photoresistor with a thickness approximately in a range between 5 μm and 10 μm. An opaque non-polar fluid 242 containing a black dye and transparent polar fluid 241 are disposed in each pixel region. The transparent polar fluid layer 241 is made of water, sodium chloride solution, or potassium chloride solution with a thickness approximately in a range between 20 μm and 250 μm. The opaque non-polar fluid layer 242 is made of decane, dodecane, or tetradecane with a thickness approximately in a range between 1 μm and 10 μm. Alternatively, the opaque non-polar fluid layer 242 comprises a black dye or a black pigment. A backlight unit 248 is disposed on the back of the substrate 247.

When the applied voltage is off, the opaque non-polar fluid 242 is uniformly distributed on the pixel region. The incident light is completely absorbed by the opaque non-polar fluid 242 such that a dark state is rendered on the pixel region.

Figure 4B:
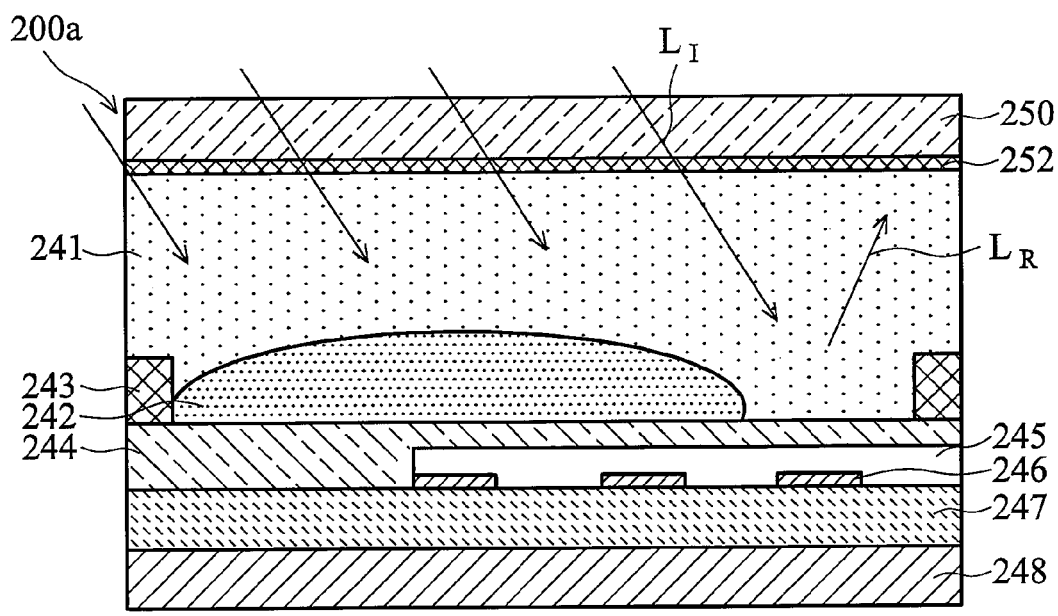
Figure 4C:
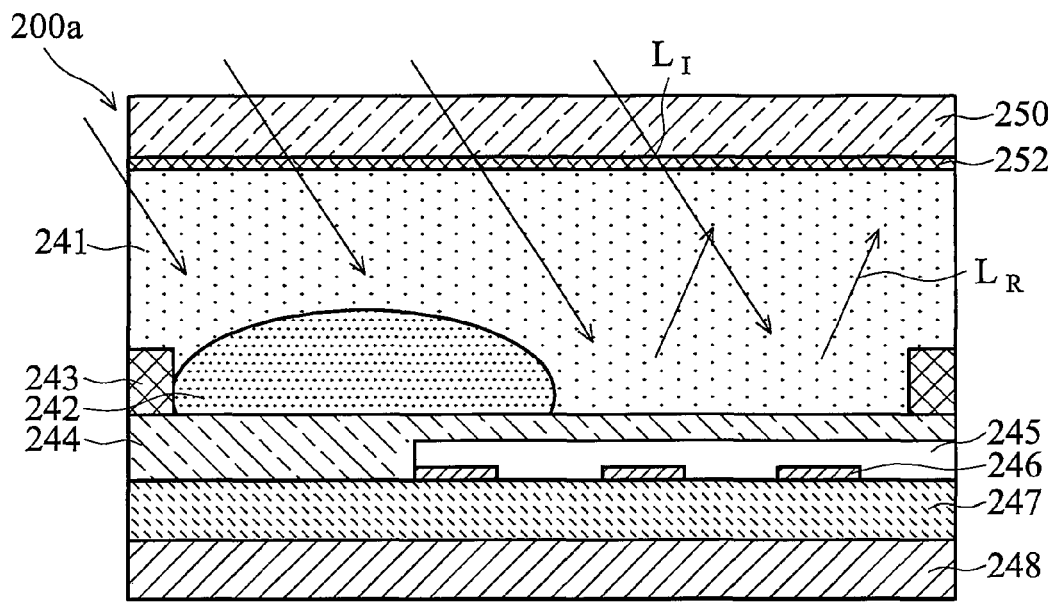
Figure 4D:
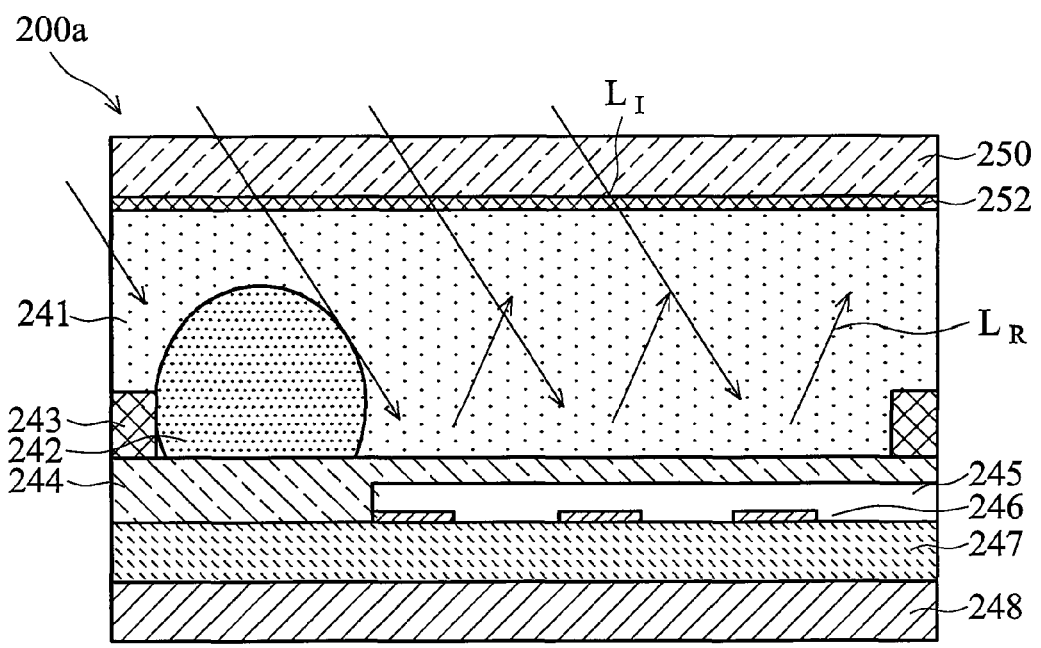
Figure 4E:
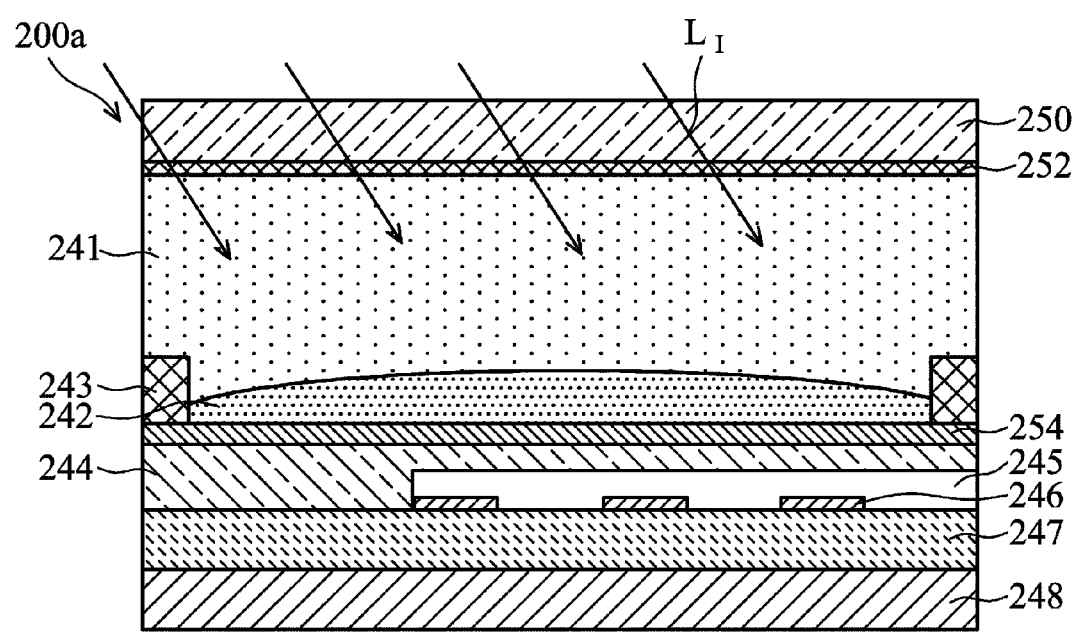

As the applied voltage increases to slightly exceed the threshold voltage, the opaque non-polar fluid 242 converge to expose a portion of the reflective region. Part of the reflective light $L_R$ from the incident light $L_I$ as well as part of the transmission from the backlight unit 248 passes through the electrowetting display device, as shown in FIG. 4B. When the applied voltage is greater than the threshold voltage but less than saturated voltage, the opaque non-polar fluid 242 converges further, such that the exposed reflective area equals the exposed transmission area, as shown in FIG. 4C. When the applied voltage is greater than the saturated voltage, the opaque non-polar fluid 242 completely converges, thus exposing both of the entire reflective and transmission regions, as shown in FIG. 4D. According to embodiments of the invention, the exposed reflective area is always equal to the exposed transmission area under any applied voltage. Thus, the gray levels and contrast ratios under the reflective mode and the transmission mode are consistently the same, thereby improving stability and quality of the transflective electrowetting display device.

Figure 5A:
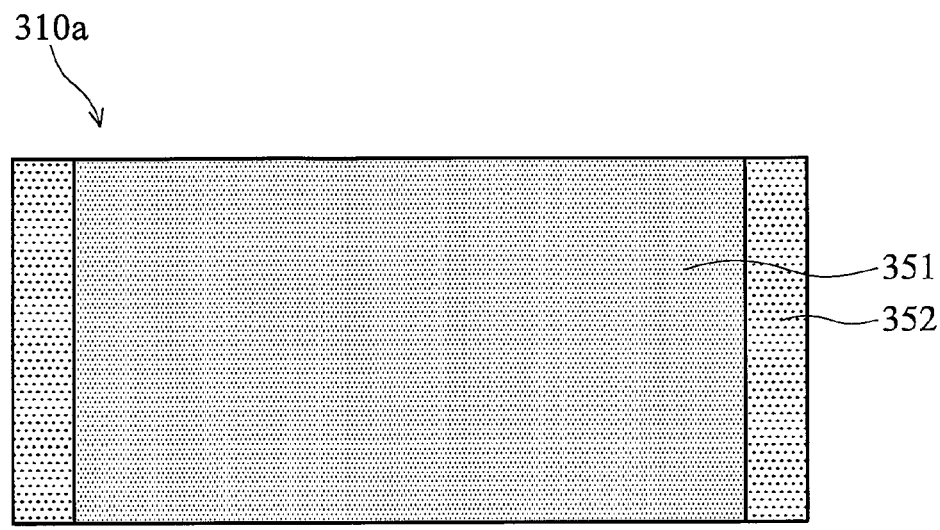
FIGS. 5A-5C are plan views illustrating an exemplary pixel of the transflective electrowetting display device under various applied voltages.
Figure 5B:
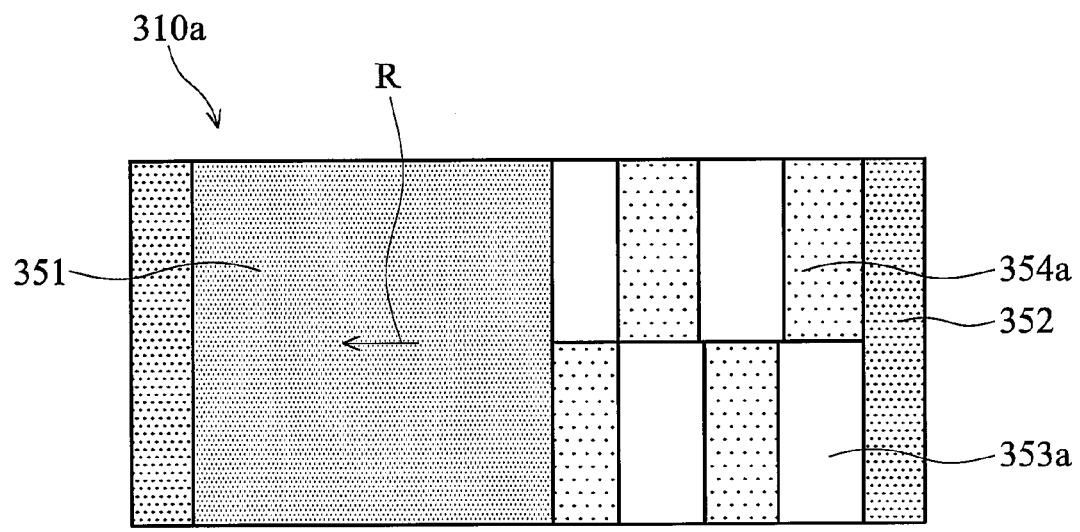
Figure 5C:
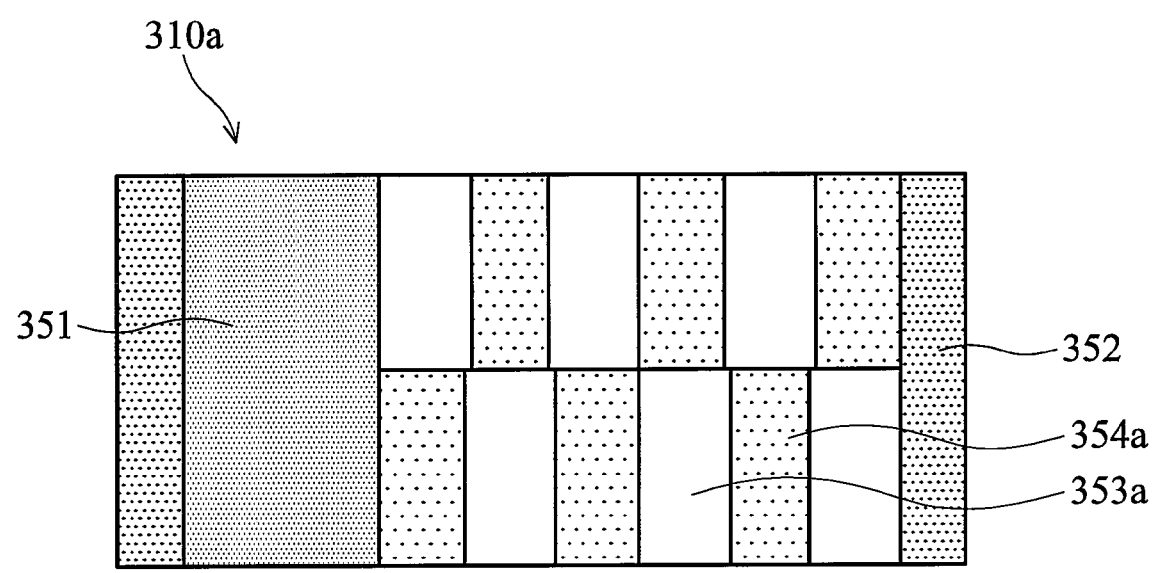

FIGS. 5A-5C are plane views illustrating an exemplary pixel of the transflective electrowetting display device under various applied voltages. The patterned hydrophilic bank structures 352 define pixel regions 310a. Periodic patterned reflector structures are periodically staggered on the substrate, thereby defining pluralities of staggered reflective regions 354a and transmission regions 353a. A transparent pixel electrode (not shown) is disposed on one side of the pixel region 310a (e.g., on the right side). Referring to FIG. 5A, when the applied voltage is off, the opaque non-polar fluid 351 is uniformly distributed on the pixel region 310a. The incident light is completely absorbed by the opaque non-polar fluid 351 such that a dark state is rendered on the pixel region.

Referring to FIG. 5B, when the applied voltage is greater than the threshold voltage but less than the saturated voltage, the opaque non-polar fluid 351 converges, due to electrowetting, along the direction R and far away from the transparent pixel electrode such that the exposed transmission area 353a equals the exposed reflective area 354a.

Referring to FIG. 5C, when the applied voltage is greater than the saturated voltage, the opaque non-polar fluid 351 completely converges due to electrowetting, thus exposing both of the entire transmission region 353a and reflective region 354a.

Figure 6A:
FIGS. 6A-6C are plan views illustrating another exemplary pixel of the transflective electrowetting display device under various applied voltages.
Figure 6B:
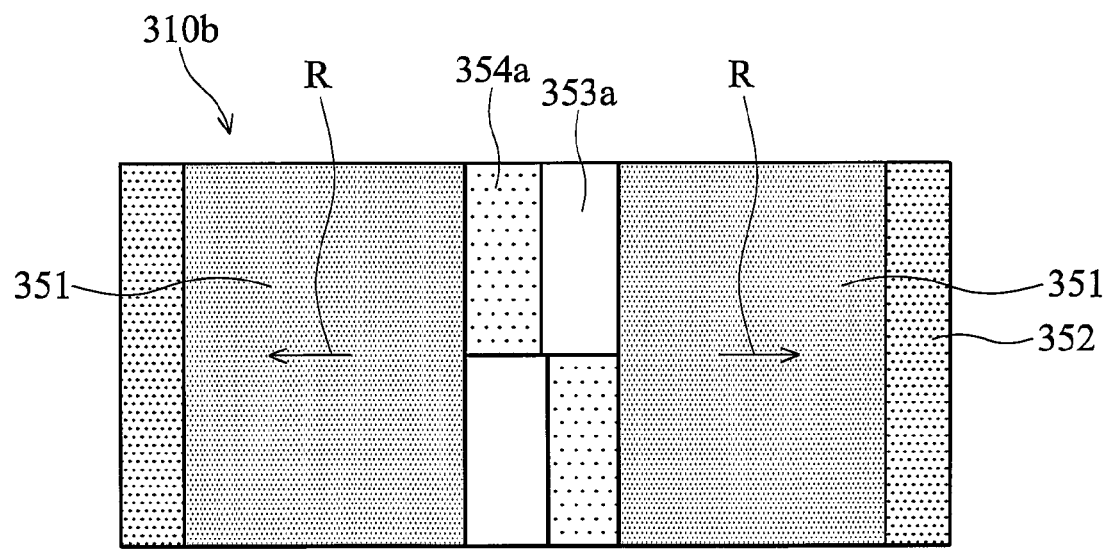
Figure 6C:
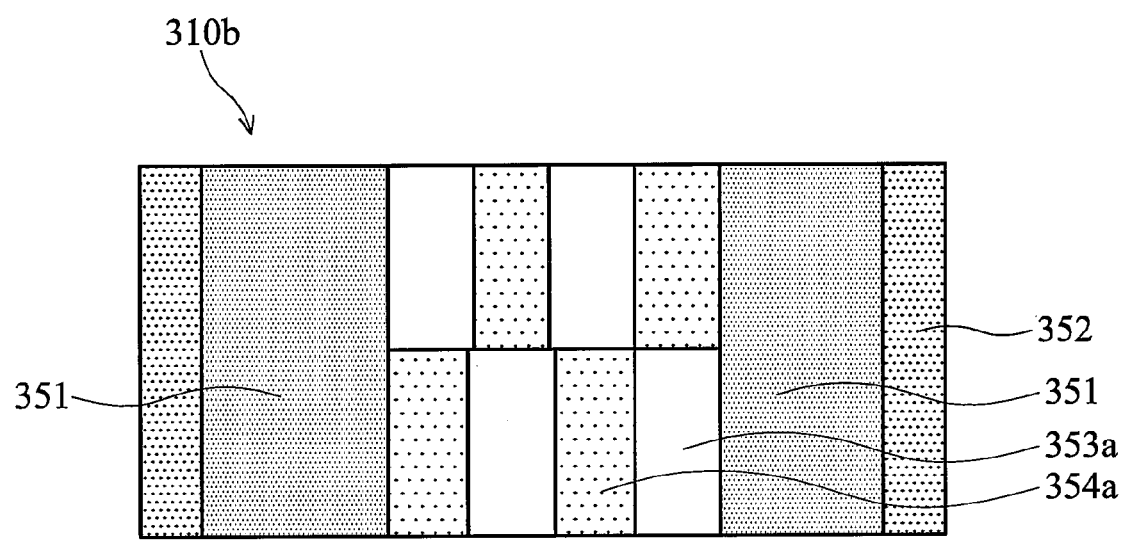

FIGS. 6A-6C are plane views illustrating another exemplary pixel of the transflective electrowetting display device under various applied voltages. The patterned hydrophilic bank structures 352 define pixel regions 310b. Periodic patterned reflector structures are periodically staggered on the substrate, thereby defining pluralities of staggered reflective regions 354a and transmission regions 353a. A transparent pixel electrode (not shown) is disposed on the central area of the pixel region 310b. Referring to FIG. 6A, when the applied voltage is off, the opaque non-polar fluid 351 is uniformly distributed on the pixel region 310b. The incident light is completely absorbed by the opaque non-polar fluid 351 such that a dark state is rendered on the pixel region.

Referring to FIG. 6B, when the applied voltage is greater than the threshold voltage but less than the saturated voltage, since the transparent pixel electrode (not shown) is disposed on the central area, the opaque non-polar fluid 351 separately converges along the direction R and towards both sides of pixel region 310b due to electrowetting such that the exposed transmission area 353a equals the exposed reflective area 354a at the central area of the pixel region 310b.

Referring to FIG. 6C, when the applied voltage is greater than the saturated voltage, the opaque non-polar fluid 351 completely converges along the direction R and towards both sides of pixel region 310b due to electrowetting, thus exposing both of the entire transmission region 353a and reflective region 354a.

Figure 7A:
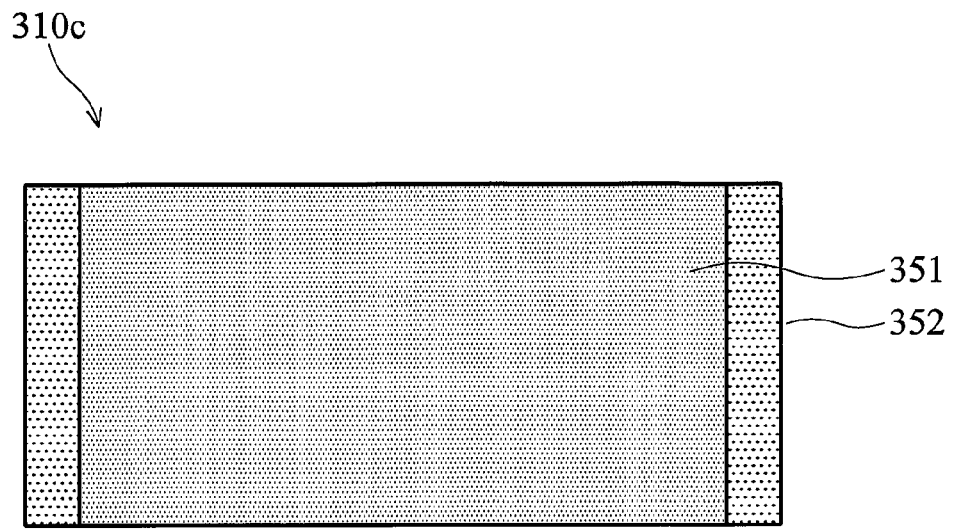
FIGS. 7A-7C are plan views illustrating another embodiment of an exemplary pixel of the transflective electrowetting display device under various applied voltages.
Figure 7B:
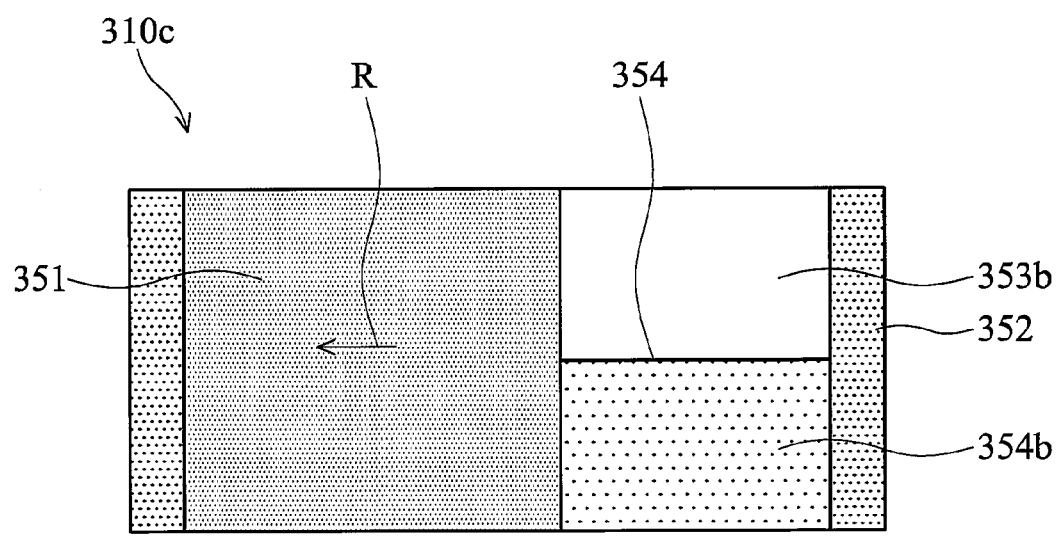
Figure 7C:
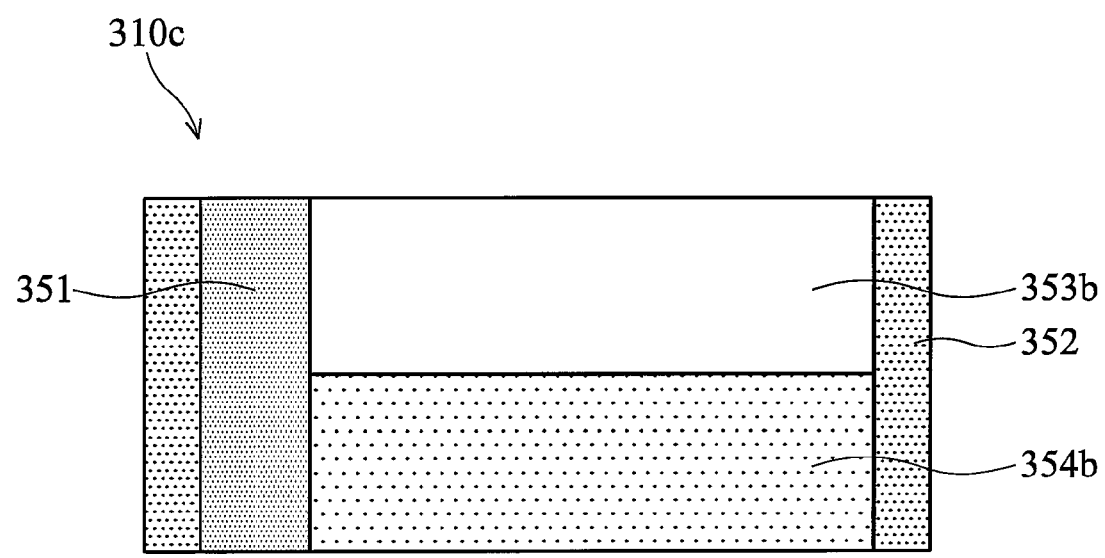

FIGS. 7A-7C are plane views illustrating another embodiment of an exemplary pixel of the transflective electrowetting display device under various applied voltages. The patterned hydrophilic bank structures 352 define pixel regions 310c. A reflector structure is disposed on the substrate, thereby defining a reflective region 354b and a transmission region 353b, wherein the reflective region 354b and the transmission region 353b are arranged at the upper part and the lower part, respectively, with a boundary 354 therebetween. A transparent pixel electrode (not shown) is disposed on one side (e.g., right side) of the pixel region 310c. Referring to FIG. 7A, when the applied voltage is off, the opaque non-polar fluid 351 is uniformly distributed on the pixel region 310c. The incident light is completely absorbed by the opaque non-polar fluid 351 such that a dark state is rendered on the pixel region.

Referring to FIG. 7B, when the applied voltage is greater than the threshold voltage but less than the saturated voltage, the opaque non-polar fluid 351 converges along the direction R and far away from the transparent pixel electrode due to electrowetting such that the exposed transmission area 353b equals the exposed reflective area 354b. The convergence direction R of the opaque non-polar fluid 351 is substantially parallel to the boundary 354.

Referring to FIG. 7C, when the applied voltage is greater than the saturated voltage, the opaque non-polar fluid 351 completely converges along the direction R and far away from the transparent pixel electrode due to electrowetting, thus exposing both of the entire transmission region 353b and reflective region 354b.

Figure 8A:
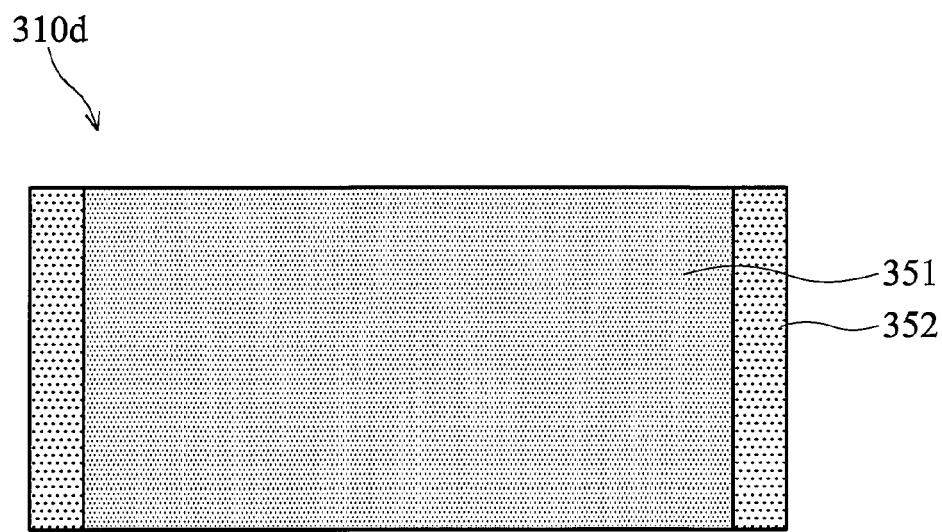
FIGS. 8A-8C are plan views illustrating yet another embodiment of an exemplary pixel of the transflective electrowetting display device under various applied voltages.
Figure 8B:
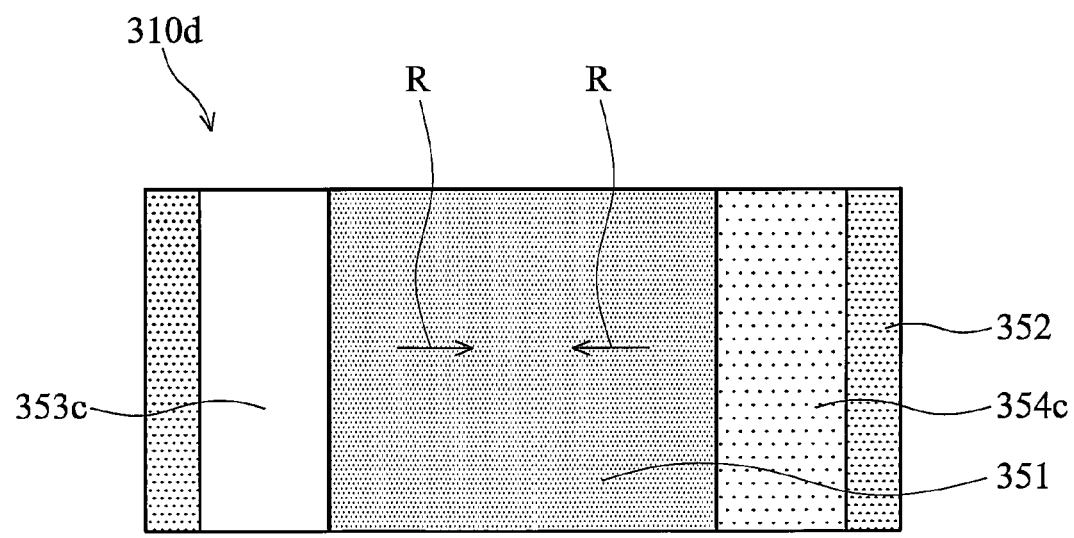
Figure 8C:
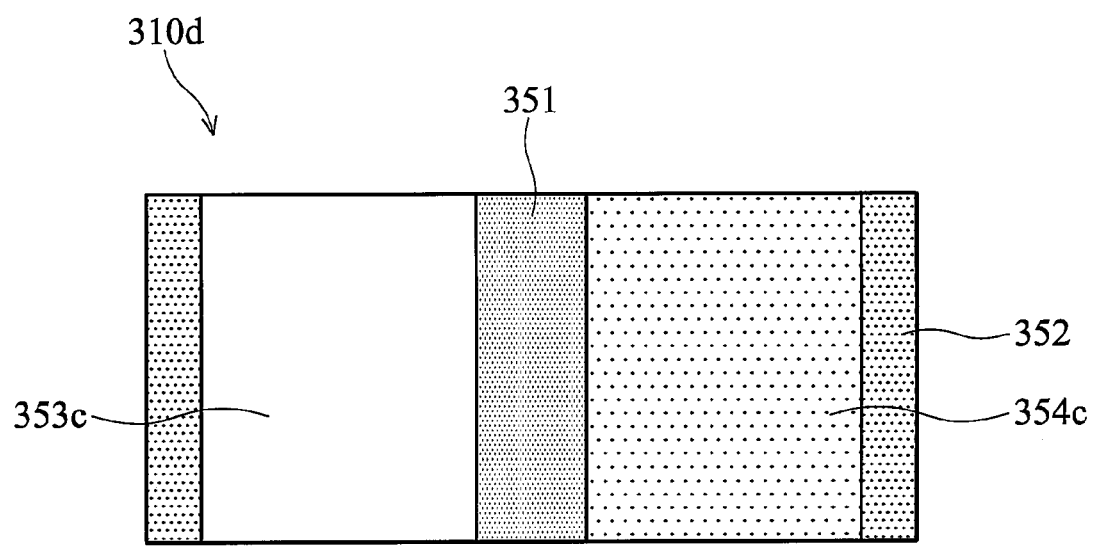

FIGS. 8A-8C are plane views illustrating yet another embodiment of an exemplary pixel of the transflective electrowetting display device under various applied voltages. The patterned hydrophilic bank structures 352 define pixel regions 310d. A reflector structure is disposed on one side (e.g., right side) of the pixel region 310d, thereby defining a reflective region 354c and a transmission region 353c. Transparent pixel electrodes (not shown) are disposed on both sides of the pixel region 310d, while at the central area of the pixel region 310d, there is no electrode. Referring to FIG. 8A, when the applied voltage is off, the opaque non-polar fluid 351 is uniformly distributed on the pixel region 310d. The incident light is completely absorbed by the opaque non-polar fluid 351 such that a dark state is rendered on the pixel region.

Referring to FIG. 8B, when the applied voltage is greater than the threshold voltage but less than the saturated voltage, since the transparent pixel electrodes (not shown) are disposed on both sides of the pixel region 310d, the opaque non-polar fluid 351 converges along the directions R and towards the central area of the pixel region 310d due to electrowetting such that the exposed transmission area 353c equals the exposed reflective area 354c on both sides of the pixel region 310d.

Referring to FIG. 8C, when the applied voltage is greater than the saturated voltage, the opaque non-polar fluid 351 completely converges along the direction R and towards the central area of the pixel region 310b due to electrowetting, thus exposing both of the entire transmission region 353c and reflective region 354c.

Figure 9A:
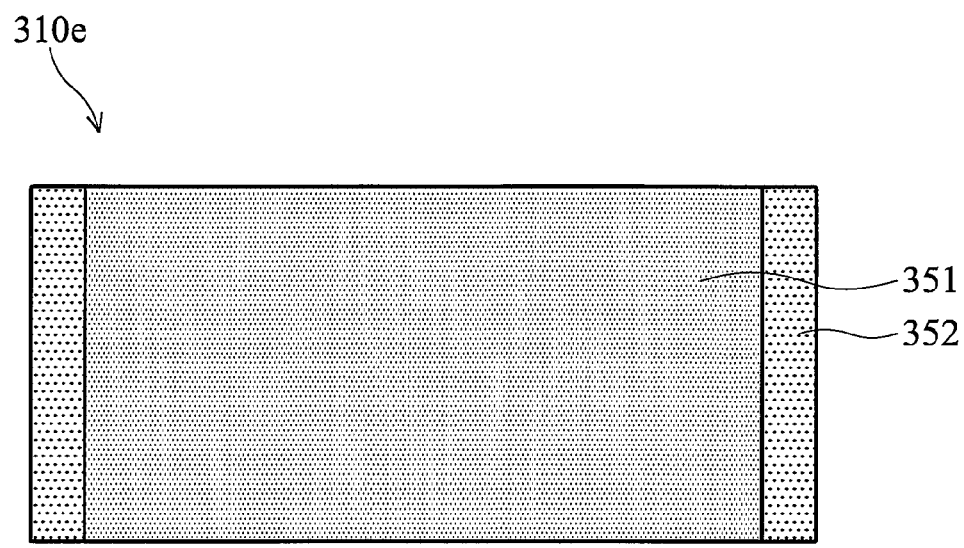
FIGS. 9A-9C are plan views illustrating still another embodiment of an exemplary pixel of the transflective electrowetting display device under various applied voltages.
Figure 9B:
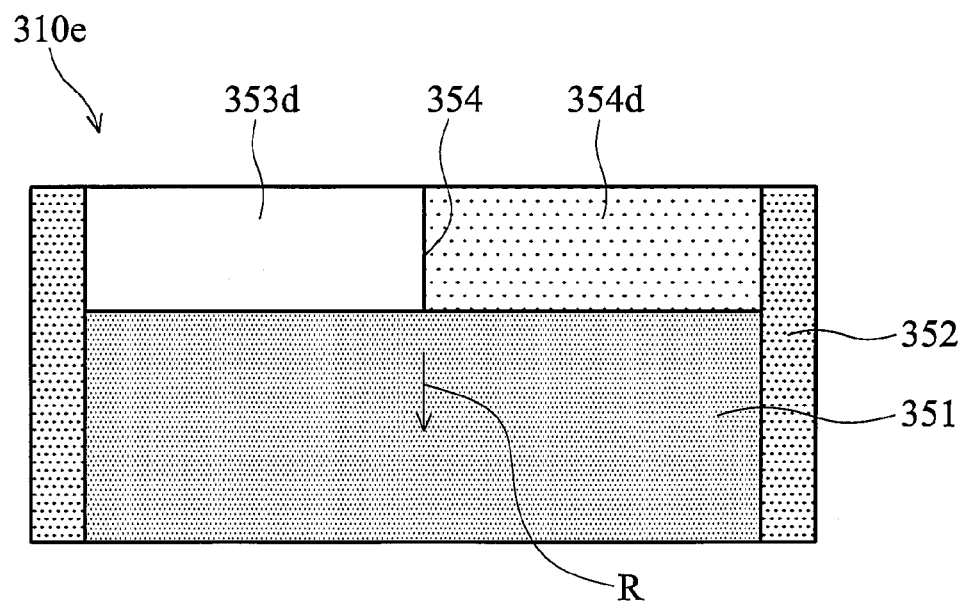
Figure 9C:
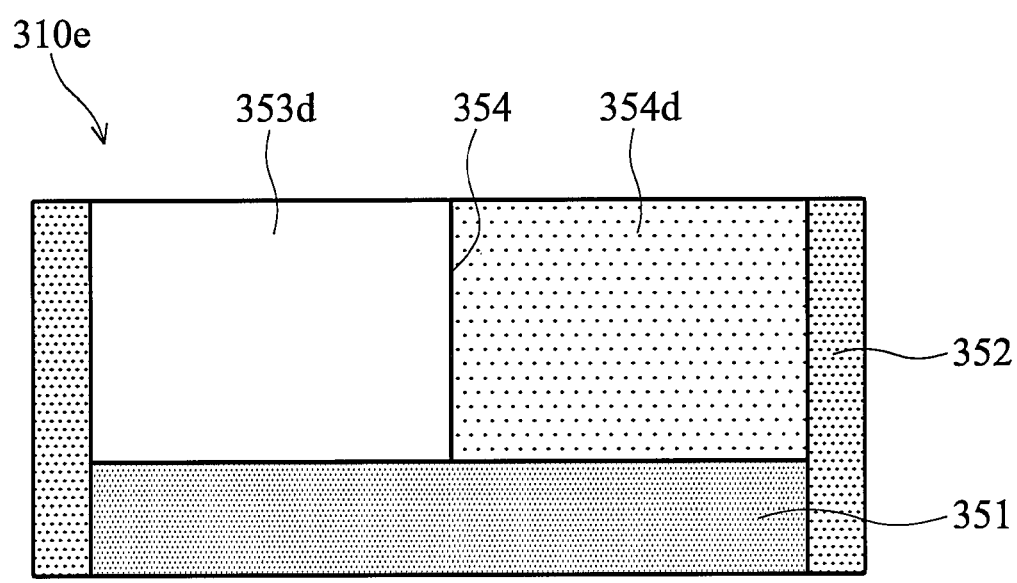

FIGS. 9A-9C are plane views illustrating still another embodiment of an exemplary pixel of the transflective electrowetting display device under various applied voltages. The patterned hydrophilic bank structures 352 define pixel regions 310e. A reflector structure is disposed on the substrate, thereby defining a reflective region 354d and a transmission region 353d, wherein the reflective region 354d and the transmission region 353d are arranged at the left part and the right part, respectively, with a boundary 354 therebetween. A transparent pixel electrode (not shown) is disposed on one side (e.g., upper side) of the pixel region 310e. Referring to FIG. 9A, when the applied voltage is off, the opaque non-polar fluid 351 is uniformly distributed on the pixel region 310e. The incident light is completely absorbed by the opaque non-polar fluid 351 such that a dark state is rendered on the pixel region.

Referring to FIG. 9B, when the applied voltage is greater than the threshold voltage but less than the saturated voltage, the opaque non-polar fluid 351 converges along the direction R and far away from the transparent pixel electrode due to electrowetting such that the exposed transmission area 353d equals the exposed reflective area 354d. The convergence direction R of the opaque non-polar fluid 351 is substantially perpendicular to the boundary 354.

Referring to FIG. 9C, when the applied voltage is greater than the saturated voltage, the opaque non-polar fluid 351 completely converges along the direction R and far away from the transparent pixel electrode due to electrowetting, thus exposing both of the entire transmission region 353d and reflective region 354d.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrowetting display device, comprising:
    a first substrate and an opposing second substrate with a transparent polar fluid layer and an opaque non-polar fluid layer interposed therebetween;
    a first transparent electrode disposed on the first substrate;
    a second transparent electrode disposed on the second substrate;
    a dielectric layer disposed on the second transparent electrode;
    a reflective plate structure interposed between the second transparent electrode and the second substrate, and having a reflective region and a transmission region; and
    a backlight plate disposed on the back of the second substrate,
    configured such that during operation, the opaque non-polar fluid converges by application of a voltage exceeding a threshold voltage to expose an area of the reflective region and an area of the transmission region, wherein the exposed area of the reflective region is equal to the exposed area of the transmission region.

2. The electrowetting display device as claimed in claim 1, wherein the second transparent electrode is a patterned structure comprising a rectangular, a square, a triangle, a circle, a trapezoid, or an ellipse.

3. The electrowetting display device as claimed in claim 1, wherein the dielectric layer has a hydrophobic surface and is directly disposed on the second transparent electrode.

4. The electrowetting display device as claimed in claim 1, further comprising a hydrophobic layer disposed on the dielectric layer.

5. The electrowetting display device as claimed in claim 4, further comprising a hydrophilic bank structure disposed on the hydrophobic layer, thereby defining a pixel region.

6. The electrowetting display device as claimed in claim 5, wherein the hydrophilic bank structure is made of a hydrophilic photoresistor.

7. The electrowetting display device as claimed in claim 5, wherein the thickness of the hydrophilic bank structure is approximately in a range between 5 mm and 10 mm.

8. The electrowetting display device as claimed in claim 4, wherein the hydrophobic layer comprises fluoride containing hydrophobic polymers.

9. The electrowetting display device as claimed in claim 4, wherein the thickness of the hydrophobic layer is approximately in a range between 0.1 mm and 1 mm.

10. The electrowetting display device as claimed in claim 1, wherein the first transparent electrode comprises indium tin oxide (ITO) or indium zinc oxide (IZO).

11. The electrowetting display device as claimed in claim 1, wherein the thickness of the first transparent electrode is approximately in a range between 0.1 mm and 1 mm.

12. The electrowetting display device as claimed in claim 1, wherein the second transparent electrode comprises indium tin oxide (ITO) or indium zinc oxide (IZO).

13. The electrowetting display device as claimed in claim 1, wherein the thickness of the second transparent electrode is approximately in a range between 0.1 mm and 1 mm.

14. The electrowetting display device as claimed in claim 1, wherein the dielectric layer is made of parylene, silicon oxide (SiOx), silicon nitride (SiNy), polyvinyldiene fluoride, lead zirconate titanate (PZT), or barium strontium titanate (BST).

15. The electrowetting display device as claimed in claim 1, wherein the thickness of the dielectric layer is approximately in a range between 0.1 mm and 1 mm.

16. The electrowetting display device as claimed in claim 1, wherein the transparent polar fluid layer is made of water, sodium chloride solution, or potassium chloride solution.

17. The electrowetting display device as claimed in claim 1, wherein the thickness of the transparent polar fluid layer is approximately in a range between 20 mm and 250 mm.

18. The electrowetting display device as claimed in claim 1, wherein the opaque non-polar fluid layer is made of decane, dodecane, or tetradecane.

19. The electrowetting display device as claimed in claim 1, wherein the thickness of the opaque non-polar fluid layer is approximately in a range between 1 mm and 10 mm.

20. The electrowetting display device as claimed in claim 1, wherein the opaque non-polar fluid layer comprises a black dye or a black pigment.

21. The electrowetting display device as claimed in claim 1, wherein the reflective plate structure is a patterned structure comprising a plurality of sub-reflective plates, wherein each sub-reflective plate corresponds to a sub-reflective region.

22. The electrowetting display device as claimed in claim 1, wherein the reflective plate structure comprises a plurality of periodic sub-reflective plates, wherein each periodic sub-reflective plate corresponds to a sub-reflective region.

23. The electrowetting display device as claimed in claim 1, wherein the reflective plate structure is a patterned structure comprising at least one reflective plate, creating a boundary between the at least one reflective plate and the transmission region, wherein during operation, a direction of convergence of the opaque non-polar fluid layer is substantially parallel with the boundary.

24. The electrowetting display device as claimed in claim 1, wherein the reflective plate structure is a patterned structure comprising at least one reflective plate, creating a boundary between the at least one reflective plate and the transmission region, wherein, during operation, a direction of convergence of the opaque non-polar fluid layer is substantially perpendicular to the boundary.

25. The electrowetting display device as claimed in claim 1, wherein the reflective plate structure is made of Al, Ag, or MoW.

26. The electrowetting display device as claimed in claim 1, wherein the reflective plate structure is a patterned structure comprising a rectangular, a square, a circular, a triangular, a trapezoid, or an ellipse.

27. An electrowetting display device, comprising:
a first substrate and an opposing second substrate with a transparent polar fluid layer and an opaque non-polar fluid layer interposed therebetween;
a first transparent electrode disposed on the first substrate;
a second transparent electrode disposed on the second substrate;
a dielectric layer disposed on the second transparent electrode;
a reflective plate structure interposed between the second transparent electrode and the second substrate, and having a plurality of reflective regions and a plurality of transmission regions; and
a backlight plate disposed on the back of the second substrate;
configured such that during operation, the opaque non-polar fluid converges by application of a voltage exceeding a threshold voltage to expose areas of the reflective regions and areas of the transmission regions, wherein the exposed areas of the reflective regions are equal to the exposed areas of the transmission regions.

28. The electrowetting display device as claimed in claim 27, wherein the reflective plate structure is a plurality of periodic reflective plates.

29. The electrowetting display device as claimed in claim 27, wherein a boundary is created between the reflective region and the transmission region and during operation, a direction of coherence of the opaque non-polar fluid layer is substantially parallel with the boundary.

30. The electrowetting display device as claimed in claim 27, wherein the reflective regions and transmission regions are arranged in a staggered pattern.

* * * * *